(12) United States Patent
Liu et al.

(10) Patent No.: US 9,137,095 B2
(45) Date of Patent: Sep. 15, 2015

(54) METHODS AND DEVICES FOR MAINTAINING A DOMAIN

(75) Inventors: Yong Liang Liu, Shanghai (CN);
Fulong Ma, Shanghai (CN); Hui Li, Shanghai (CN); Changjie Wang, Shangai (CN)

(73) Assignee: Koninklijke Philips N.V., Eindhoven (NL)

( * ) Notice: Subject to any disclaimer, the term of this patent is extended or adjusted under 35 U.S.C. 154(b) by 199 days.

(21) Appl. No.: 13/879,719

(22) PCT Filed: Nov. 15, 2011

(86) PCT No.: PCT/IB2011/055091
§ 371 (c)(1),
(2), (4) Date: Apr. 16, 2013

(87) PCT Pub. No.: WO2012/066476
PCT Pub. Date: May 24, 2012

(65) Prior Publication Data
US 2013/0227649 A1    Aug. 29, 2013

(30) Foreign Application Priority Data

Nov. 18, 2010    (WO) ................ PCT/CN2010/078860

(51) Int. Cl.
| G06F 7/04 | (2006.01) |
|---|---|
| G06F 15/16 | (2006.01) |
| G06F 17/30 | (2006.01) |
| H04L 29/06 | (2006.01) |
| H04L 12/24 | (2006.01) |
| H04L 9/08 | (2006.01) |

(52) U.S. Cl.
CPC ................ H04L 41/00 (2013.01); H04L 9/085 (2013.01)

(58) Field of Classification Search
CPC ........ H04B 63/08; H04B 63/10; H04B 63/20; H04B 63/083; H04W 12/06
USPC ............................................................ 726/3
See application file for complete search history.

(56) References Cited

U.S. PATENT DOCUMENTS

| 2003/0226013 | A1 | 12/2003 | Dutertre |
| 2007/0234116 | A1* | 10/2007 | Yoshikawa et al. ............. 714/13 |
| 2007/0250617 | A1* | 10/2007 | Kim et al. ...................... 709/223 |
| 2008/0052388 | A1 | 2/2008 | Korkishko et al. |
| 2009/0254526 | A1 | 10/2009 | Power et al. |
| 2009/0300724 | A1 | 12/2009 | Cho et al. |
| 2010/0043060 | A1 | 2/2010 | Reuzel et al. |
| 2010/0061231 | A1* | 3/2010 | Harmatos et al. ............. 370/228 |
| 2010/0142365 | A1 | 6/2010 | Richardson et al. |
| 2010/0217986 | A1* | 8/2010 | Schneider ..................... 713/171 |
| 2010/0287200 | A1* | 11/2010 | Dhuse .......................... 707/770 |

FOREIGN PATENT DOCUMENTS

| WO | 0019652 A1 | 4/2000 |
| WO | 2006129225 A2 | 12/2006 |

* cited by examiner

*Primary Examiner* — Kambiz Zand
*Assistant Examiner* — Stephen Sanders

(57) ABSTRACT

The invention proposes methods and devices for managing domains. The domains comprise a plurality of member devices, and the method comprises the steps of: storing (S500, S501), by a first domain manager (M1), domain management information (P1, P2, P3, P4 and P5) in said plurality of member devices; and obtaining (S510, S511), by a second domain manager (M2), said domain management information from at least one of said plurality of member devices. In comparison with the prior art, where the domain management information is maintained in the domain authority, the embodiment decreases the work load of the domain authority and provides conveniences.

6 Claims, 3 Drawing Sheets

METHODS AND DEVICES FOR MAINTAINING A DOMAIN

TECHNICAL FIELD

The present invention relates to domain management, and particularly to managing domain management information.

BACKGROUND

Currently, people might own several consumer electronics devices such as PCs, smart phones, audio/video players and other portable devices. Content provided by content providers, such as music provided by an on-line music provider, can be shared on these devices via a "domain" built among them. The domain usually has a domain manager that is responsible for various domain operations, such as security authentication requests (logging in, checking permissions, etc.), maintaining and enforcing the domain policy. And it uses much domain management information for managing the domain, for example the list of member devices, the domain policy, and domain secrets such as private keys of the domain manager, root certificate and pin code of the domain.

The domain management information should be maintained. For example, the domain manager might be replaced because, for example, the device bearing the domain manager is lost or damaged, and the new domain manager should acquire domain management information to manage the domain. Taking domain secrets as an example, traditionally, the new domain manager determines new domain secrets, such as the public keys and the private keys, and rebuilds the domain management message. This is not a highly efficient scheme, because it cannot make good use of the previous domain management information. According to a solution proposed by US2008/0052388A1, the previous domain manager stored the domain management information in a domain authority of the domain, such as the authorizing server of the content provider, so that the new domain manager can retrieve domain management information from the domain authority.

SUMMARY OF THE INVENTION

According to the prior art, the domain management information is maintained by the domain authority. The drawbacks of the prior art include that:

(1) the load on the domain authority is heavy since it maintains the management information of the domains all over the country or the globe. And the management information, such as the member device list, sometimes takes up a relatively large amount of storage space; and (2) the previous as well as the new domain manager need to be on-line to exchange the domain management information with the domain authority.

Thus, it would be advantageous to provide a method of maintaining the domain and a device that reduces the workload of the domain authority. It would also be advantageous to maintain the domain management information in a more convenient manner, for example off-line.

To achieve at least one of these objects, in a first aspect of the invention, there is provided a method of managing a domain comprising a plurality of member devices, the method comprising the steps of: storing, by a first domain manager, domain management information in said plurality of member devices; obtaining, by a second domain manager, said domain management information from at least one of said plurality of member devices.

In this aspect, the domain management information is stored in the member devices of the domain, instead of in the domain authority. Thus, the working load on the domain authority is decreased. And the domain manager can obtain the domain management information from the member devices off-line without accessing the on-line domain authority, which is more convenient.

In some cases, the domain management information comprises management information that needs to be kept accessible only for domain managers, such as domain secrets. Thus, it is advantageous to maintain the confidentiality of this part of the domain management information. To this end, in a preferred embodiment of the first aspect, said storing step comprises the sub-steps of:

generating a plurality of pieces of data from at least part of said domain management information, such that at least two pieces of data which are different from each other are required for recovering said at least part of said domain management information;

distributing said plurality of pieces of data to said plurality of member devices respectively;

wherein said obtaining step comprises the sub-steps of:

receiving at least two pieces of data which are different from each other from at least two of said plurality of member devices;

recovering said at least part of said domain management information from the received at least two pieces of data.

In this embodiment, the management information, such as domain secrets, is distributed among the member devices. Only the domain manager can collect the pieces and recover the management information. Thus, the security of this embodiment is higher.

In a preferred embodiment, the number of pieces of data that are generated is larger than the number of pieces of data that are required for recovering the management information, which means that the domain manager need not collect all the pieces of data in order to recover the management information, and thus the robustness of this embodiment is increased.

In a preferred embodiment, said generating step comprises the sub-steps of:

constructing a polynomial, wherein said at least part of said domain management information is configured to be a coefficient of a term of the polynomial;

generating said plurality of pieces of data by using said constructed polynomial;

wherein the number of pieces of data that are received in the receiving step is not less than the number of the terms of the polynomial;

and said recovering step calculates said coefficient according to the received pieces of data.

In another embodiment, said generating step splits said at least part of said domain management information into a plurality of pieces of data;

said receiving step receives the plurality of pieces of data;

and said recovering step combines the received pieces of data into said at least part of said domain management information.

In these embodiments, the operations necessary to share the management information are relatively simple and efficient; thus, the overhead for maintaining the domain is low.

In another preferred embodiment, the first domain manager is the previous domain manager of the domain and said second domain manager supersedes said first domain manager as the new domain manager of the domain, and the method further comprises, before said obtaining step, the steps of:

authenticating, by a domain authority of the domain, the second domain manager;

authenticating, by said at least one of said plurality of member devices, the second domain manager.

In this embodiment, the new domain manager needs to be authenticated before being able to obtain the management information stored by the previous domain manager. Thus, the security of this embodiment is relatively high.

Correspondingly, in a second aspect, there is provided a method of managing a domain by a domain manager of the domain, and the domain comprises a plurality of member devices, wherein the method comprises: storing domain management information in said plurality of member devices.

In a third aspect, there is provided a method of managing a domain by a domain manager of the domain, the domain comprising a plurality of member devices in which domain management information is stored, wherein the method comprises the step of: obtaining said domain management information from at least one of said plurality of member devices.

In a fourth aspect, there is provided a device for managing a domain, the domain comprising a plurality of member devices, wherein the device comprises: a first unit for storing domain management information in said plurality of member devices.

In a fifth aspect, there is provided a device for managing a domain, the domain comprising a plurality of member devices in which domain management information is stored, wherein the device comprises: a second unit for obtaining said domain management information from at least one of said plurality of member devices.

These and other features of the present invention will be described in detail in the embodiment part.

BRIEF DESCRIPTION OF THE DRAWINGS

Features, aspects and advantages of the present invention will become apparent from reading the following description of non-limiting embodiments with the aid of the appended drawings. In the drawings, same or similar reference numerals refer to the same or similar steps or means.

DETAILED DESCRIPTION OF EMBODIMENTS

A method of managing a domain comprising a plurality of member devices, the method comprising the steps of:

storing, by a first domain manager, domain management information in said plurality of member devices;

obtaining, by a second domain manager, said domain management information from at least one of said plurality of member devices.

Figure 1:
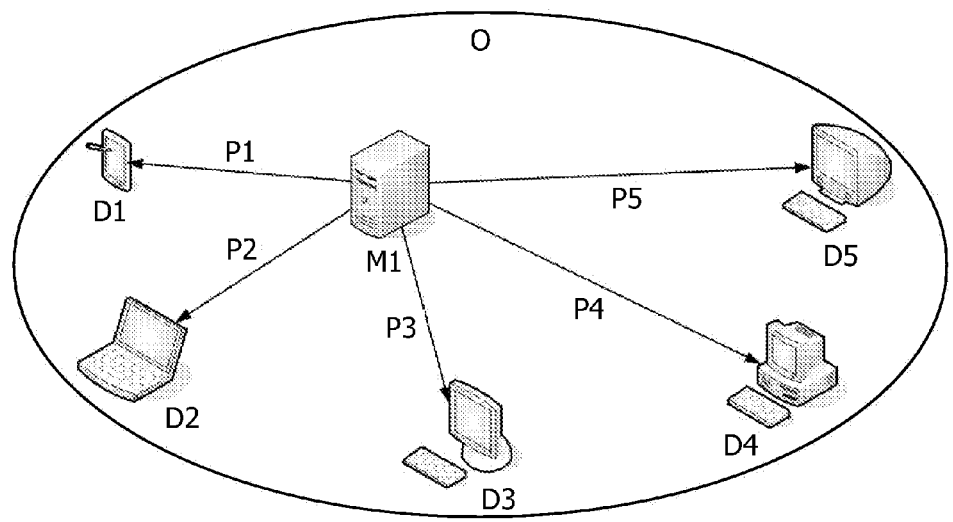
FIGS. 1 and 2 respectively show a schematic view of the domain before and during superseding the domain manager.
Figure 2:
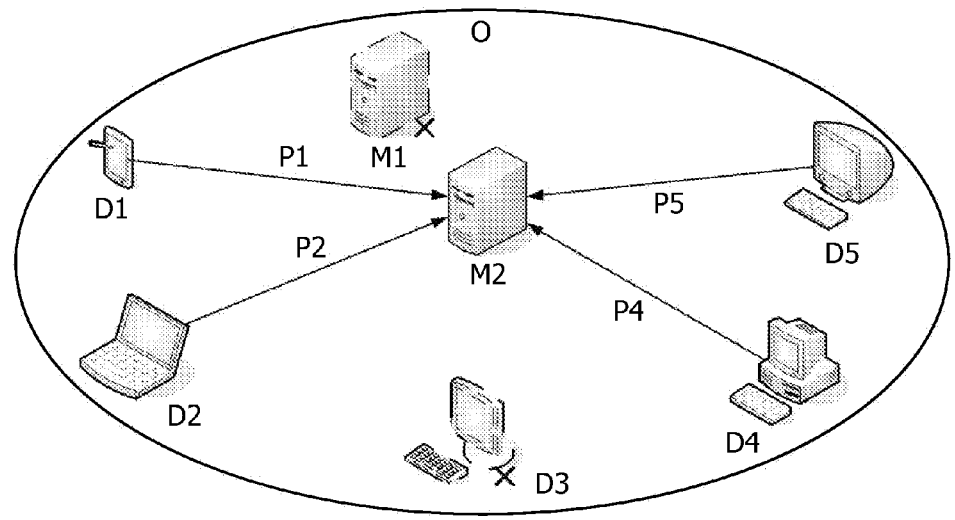

A scenario in which a new domain manager supersedes a previous domain manager is described by way of example. As shown in FIGS. 1 and 2, the domain O comprises a plurality of member devices D1, D2, D3, D4 and D5. As shown in FIG. 1, domain manager M1 is the previous domain manager. And as shown in FIG. 2, domain manager M1 crashed, for example, and needs to be superseded by the new domain manager M2. It should be noted that, in this example, the invention is not limited in terms of domain topology and in terms of the scenario of the superseding domain manager.

With reference to FIG. 1 to FIG. 5, the concept of the invention will be elucidated by describing the devices and the methods according to embodiments of the invention.

Figure 3:
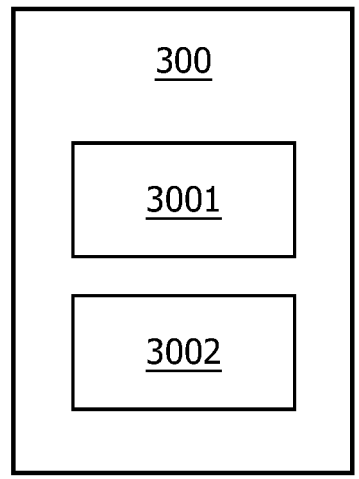
FIG. 3 shows a block diagram of a device 30 for managing a domain by the previous domain manager as shown in FIG. 1, according to an embodiment of the invention.

As shown in FIG. 3, the device 30 for managing a domain comprises: a first unit 300 for storing domain management information in said plurality of member devices.

Figure 4:
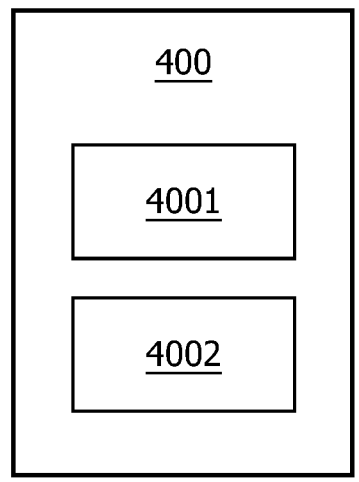
FIG. 4 shows a block diagram of a device 40 for managing a domain by the new domain manager as shown in FIG. 2, according to an embodiment of the invention.
Figure 5:
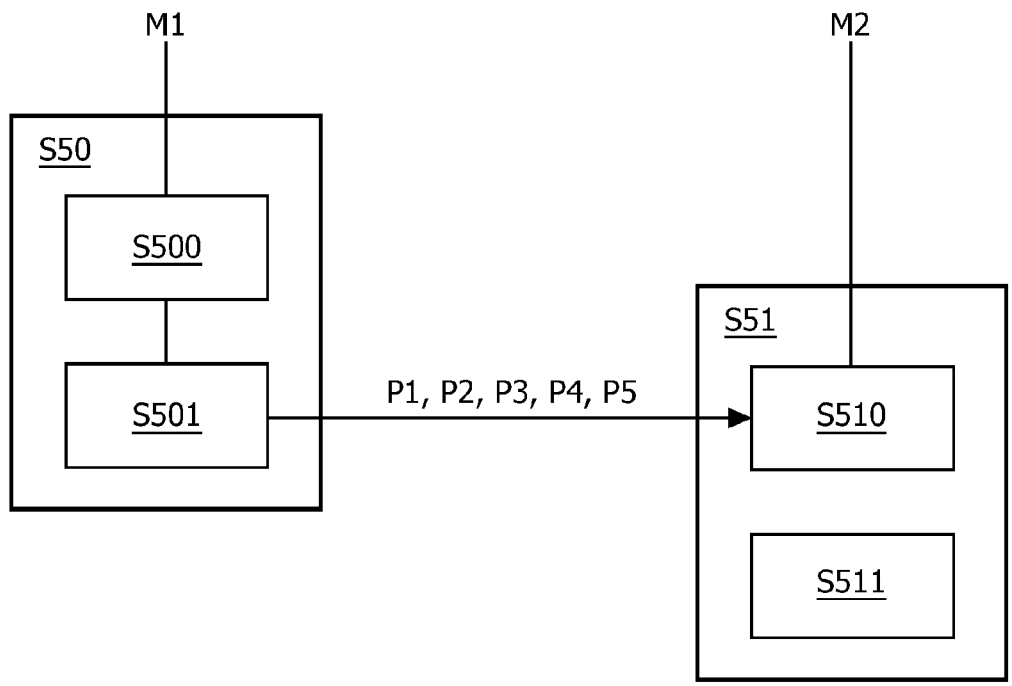
FIG. 5 shows a flowchart of the method of managing a domain, according to an embodiment of the invention.

As shown in FIG. 4, the device 40 for managing a domain comprises: a second unit 400 for obtaining said domain management information from at least one of said plurality of member devices.

Initially, the domain manager M1 was authorized to act as the domain manager of this domain O by the corresponding domain authority.

At a later stage, in step S50, the first unit 300 of the device 30 in the domain manager M1 stores domain management information in the member devices D1, D2, D3, D4 and D5.

In one embodiment, some domain management information, such as a list of member devices, could be stored in duplication in each of the member devices D1, D2, D3, D4 and D5 by the first unit 300. And the new domain manager could obtain this information from at least any one of the member devices.

In another embodiment, domain secrets in the domain management information, such as domain policy, pin code as well as private keys, could be managed in a more secure way. The first unit 300 further comprises a first submit 3001 and a second subunit 3002.

In step S500, the first subunit 3001 generates a plurality of pieces of data, for example, 5, from the domain secret such that at least two pieces of data which are different from each other are required for recovering the domain secret.

In one preferred embodiment, the first subunit 3001 uses secret sharing techniques to generate the pieces. One of the secret sharing techniques is the polynomial method. According to the polynomial method, the first unit 300 constructs a polynomial, wherein the domain secret is configured to be a coefficient of a term of the polynomial. After that the first subunit 3001 generates pieces of data by using the constructed polynomial. The principle of the polynomial method is elucidated by means of the following example.

If it is determined by the domain manager that at least n different pieces are required for recovering the domain secret, a polynomial with n terms can be constructed. For example, in this embodiment 3 pieces are required for recovering the domain secret, and thus the first subunit 3001 constructs a quadratic polynomial $$f(x)=(ax^2+bx+M)\bmod p$$

where p is a random prime larger than any of the coefficients. The coefficients a and b are chosen randomly; they are kept secret and discarded after the pieces have been distribute. M is the domain secret. The prime p is public.

The 5 pieces are obtained by calculating the polynomial at 5 different points:

$$p_i=(f(xd_i),i), i=1, 2, 3, 4 \text{ and } 5$$

In other words, the first piece could have two values ($f(x_1)$, 1), i.e. the polynomial evaluated at x=1; the second piece could be ($f(x_2)$, 2), and so forth.

Since the quadratic polynomial has three unknown coefficients, a, b, and M, any three pieces can be used to create three equations, while neither one nor two pieces can. And four or five pieces are redundant.

For example, let M be 10. And f(x) is constructed as follows:

$$f(x)=(7x^2+8x+10) \bmod 11$$

where 7, 8 and 11 were chosen randomly.

The 5 pieces are:

$$p_1=(f(1),1)=(3,1)$$

$$p_2=(f(2),2)=(10,2)$$

$$p_3=(f(3),3)=(9,3)$$

$$p_4=(f(4),4)=(0,4)$$

$$p_5=(f(5),5)=(5,5)$$

In another preferred embodiment, the first subunit 3001 splits the domain secret into at least 3 sections. For example, the domain secret is 10 and 000001010 in binary format. Thus, the first section is 000, the second section is 001 and the third section is 010. Each section can be taken as one of the 5 pieces of data. For example, section 1 is duplicated as piece 1 and 2, section 2 is duplicated as piece 3 and 4 and section 5 is taken as piece 5.

Then in step S501, the second subunit 3002 distributes the generated 5 pieces of data to member devices D1, D2, D3, D4, and D5, respectively. As shown in FIG. 1, pieces P1 is stored in D1, pieces P2 is stored in D2 and so forth. IN this way, the domain management information has been stored. Practically, the pieces can be sent to the member device via LAN or WLAN supporting this domain.

In the case that the domain manager M1 is down. The owner of the domain uses the new domain manager M2 to supersede the domain manager M1.

Preferably, to increase the security, before obtaining the stored domain management information, the new domain manager M2 needs to request authentication by the domain authority and the member devices. These authentications can be done in the registration procedure of the new domain manager, and as this procedure does not relate to the essence of the invention, it will be discussed in a later part.

In step S51, the second unit 400 of the device 40 obtains the domain management information from the member devices D1, D2, D3, D4 and D5.

In the embodiment in which the first unit 300 stores the domain management information in duplication in each of the member devices D1, D2, D3, D4 and D5, the second unit 400 obtains this information from at least any one of the member devices.

In the preferred embodiment in which the domain manager M1 generated 5 different pieces from the domain secret and distributed the pieces among the member devices, the second unit 400 comprises a third subunit 4001 and a fourth subunit 4002.

In step S510, the third subunit 4001 receives at least 5 pieces of mutually different data from at least 3 of the member devices D1, D2, D3, D4 and D5.—

In this embodiment, the member device D3 is turned off Thus, the third subunit 4001 receives pieces P1, P2, P4 and P5. Please note that the number of pieces of data generated is larger than the number of pieces of data that are required for recovering; thus, the domain manager M2 does not need to collect all 5 pieces of data in order to recover the domain secret, and thus the robustness of this embodiment is increased.

Corresponding to the above, in a preferred embodiment the domain manager M1 uses the polynomial method to generate the pieces. And in step S511, the fourth subunit 4002 calculates the coefficient M according to the 3 received pieces of data. Specifically, the fourth subunit 4002 uses any three of the four received pieces, for example P1, P4 and P5, and solves the following set of formulas:

$$a*1^2+b*1+M\equiv 3 \pmod{11}$$

$$a*3^2+b*3+M\equiv 9 \pmod{11}$$

$$a*4^2+b*4+M\equiv \pmod{11}$$

And the solution will be a=7, b=8, and M=10. Thus, M is recovered.

Additional calculations can be done according to other sets of three pieces, such as P2, P4 and P5, to recover another M and verify M by comparing the recovered several Ms.

Corresponding to the above, in another preferred embodiment the domain manager M1 splits the domain secret into at least 3 sections and takes each section as one of 5 pieces of data. The fourth subunit 4002 combines the received sections 1, 2 and 3 into the domain secret.

After the domain management information has been obtained, the new domain manager could continue to utilize the domain management information.

Figure 6:
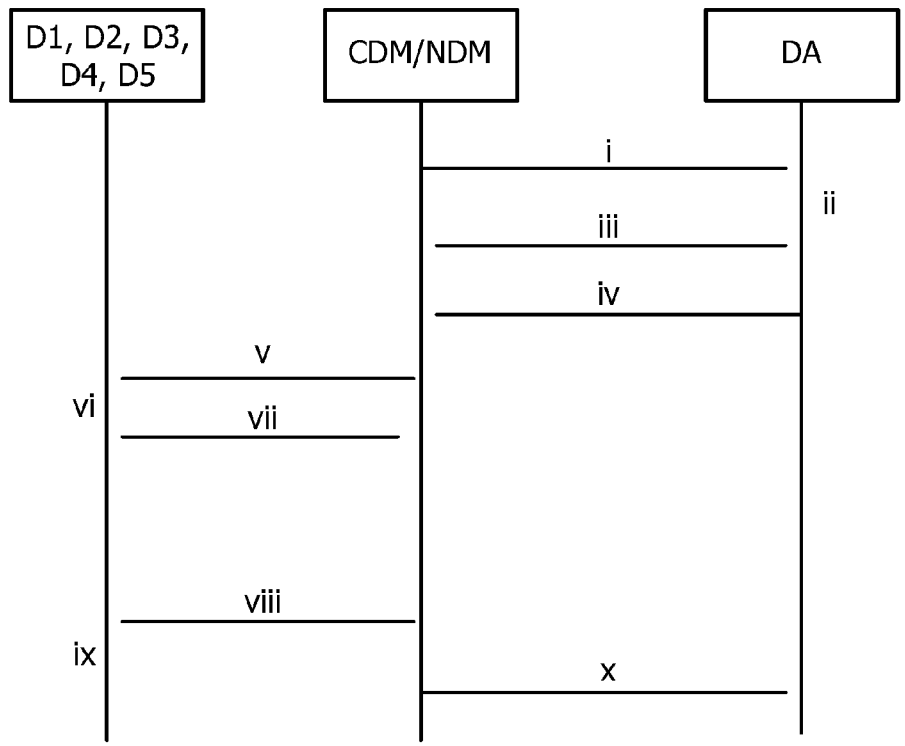
FIG. 6 shows a registration procedure of the domain manager.

Referring to FIG. 6, the following part describes the registration procedure of the new domain manager.

i. Domain manager owner (DMO) sends request message to supersede domain manager to Domain Authority (DA) using a candidate domain manager (CDM); the request message may include $PDM_{DAID}$ (ID of the previous domain manager allocated by DA), $CDM_{IID}$ (Initial ID of the CDM), and a signature on the request by DMO to supersede DM.

ii. DA verifies signature. If the result of the verification is "pass", go on to the next step; otherwise, return error message and stop domain manager superseding process.

iii. DA and CDM authenticate each other. If mutual authentication is "success" and DA identifies that CDM can be a domain manager, go on to the next step; otherwise, error message is returned and domain manager superseding process is stopped.

iv. DA creates domain management information for CDM, such as $CDM_{DAID}$ (ID of the CDM allocated by DA), domain management key and authorization certificate for CDM as the domain manager; and creates DM superseding certificate which includes $PDM_{DAID}$, $CDM_{DAID}$, the description of DM superseding and signature by DA on the above mentioned information. Alternatively, DA might send the latest domain policy to CDM if DA has ever created more than one domain policy for PDM.

v. The CDM becomes the new domain manager (NDM) and sends DM superseding certificate with DA signature to each member device.

vi. Each member device verifies the superseding signature. If verification is "pass", go on to the next step; otherwise, return error message and stop DM superseding process.

vii. NDM and each device authenticate each other. If mutual authentication is "success", each device sends the stored piece to the NDM, and the NDM recovers the domain management information; otherwise, error message is returned and DM superseding process is stopped.

viii. NDM sends some domain management information, such as domain policy and public keys, to every device.

ix. Every device verifies domain management information with NDM's signature. If verification is "pass", devices accept domain management information updated by NDM and replace the old information; otherwise, return error message.

x. NDM informs DA that DM superseding process is completed.

It should be noted that the number of pieces of data and the number of member devices are not necessarily the same. They could be the same, in which case one piece of data is stored into one member device; they could also be different, however, in which case either the data pieces outnumber the member devices or the other way round. In the latter case, one data piece may be stored in more than one member device, or more than one data piece may be stored in one member device.

It should be noted that the terms domain manager and member device are meant to describe the function of one apparatus in the respective domain, and that this should not be construed as limiting the practical apparatus bearing the domain manager or the member devices. For example, the domain manager may be just a smart phone, and the member devices may be PCs.

The above units and sub-units can be implemented by way of either software or hardware or a combination thereof. For example, the program codes achieving the functions of these units or sub-units are stored in a memory. These codes are loaded and executed by the CPU or other controller which controls the apparatus bearing the domain manager. In another example, a certain IC chip achieves the functions of these units and sub-units, and the chip can be controlled by the CPU or other controller. Those skilled in the art could implement embodiments of the invention in various ways according to the concept and principle taught by the description.

Those of ordinary skill in the art could understand and realize modifications to the disclosed embodiments, through studying the description, drawings and appended claims. All such modifications which do not depart from the spirit of the invention are intended to be included within the scope of the appended claims. The word "comprising" does not exclude the presence of elements or steps not listed in a claim or in the description. The word "a" or "an" preceding an element does not exclude the presence of a plurality of such elements. In the practice of the present invention, several technical features in the claims can be embodied by one component. In the claims, any reference signs placed between parentheses shall not be construed as limiting the claim.

What is claimed is:

1. A method of managing a domain comprising a plurality of member devices, the method comprising the steps of:
   storing, by a first unit, domain management information into the plurality of member devices, comprising:
   generating, by a first subunit a plurality of pieces of data from at least part of a domain management information, wherein each of the plurality of pieces of data is different; and
   distributing, by a second sub-unit, individual ones of the plurality of pieces of data to corresponding ones of the plurality of member devices;
   obtaining, by a second domain manager, the domain management information from at least one of the plurality of member devices, comprising:
   receiving at least two pieces of data from a corresponding number of the plurality of member devices;
   determining whether a number of different pieces of the received at least two pieces of data have been received, wherein the number of different pieces is determined based on the generating of the plurality of pieces of data; and
   recovering the at least part of the domain management information from the determined number of different pieces of received data when the determined number of different pieces of received data exceeds a threshold value.

2. The method according to claim 1, the generating step comprising:
   constructing a polynomial, wherein the at least part of the domain management information is configured to be a coefficient of a term of the polynomial; and
   generating the plurality of pieces of data using the constructed polynomial; and
   the recovering step comprising:
   calculating the coefficients according to the received pieces of data, wherein the number of different pieces of data is comparable to a number of terms of the polynomial.

3. The method according to claim 1, the generating step comprising:
   splitting the at least part of the domain management information into the plurality of pieces of data; and
   the receiving step
   receiving all of the plurality of pieces of data; and
   combining the received pieces of data into the at least part of the domain management information.

4. The method according to claim 1, further comprising:
   authenticating, by a domain authority of the domain, the second domain manager;
   authenticating, by the at least one of the plurality of member devices, the second domain manager.

5. A device for managing a domain, the domain comprising a plurality of member devices, wherein the device comprises:
   a first unit for storing domain management information in the plurality of member devices;
   wherein the first unit comprises:
   a first subunit for generating a plurality of pieces of data from at least part of the domain management information; wherein a number of different pieces is determined based on the generating of the plurality of pieces of data;
   a second subunit for distributing the plurality of pieces of data to the plurality of member devices, respectively.

6. A device for managing a domain, the domain comprising a plurality of member devices in which domain management information is stored in a plurality of pieces of data generated from at least part of the domain management information, such that at least two of the pieces of data which are different from each other are required for recovering the at least part of the domain management information and the plurality of data are distributed to the plurality of member devices respectively, wherein the device comprises:
   a second unit for obtaining the domain management information from at least one of the plurality of member devices, the second unit (400) comprises:
   a third subunit for:
   receiving at least two pieces of data which are different from each other from at least two of the plurality of member devices; and
   determining whether a number of different pieces of the received at least two pieces of data have been received, wherein the number of different pieces is determined based on the generating of the plurality of pieces of data; and a fourth subunit for retrieving the at least part of the domain management information from the received at least two pieces of data.

* * * * *